Patented July 18, 1933

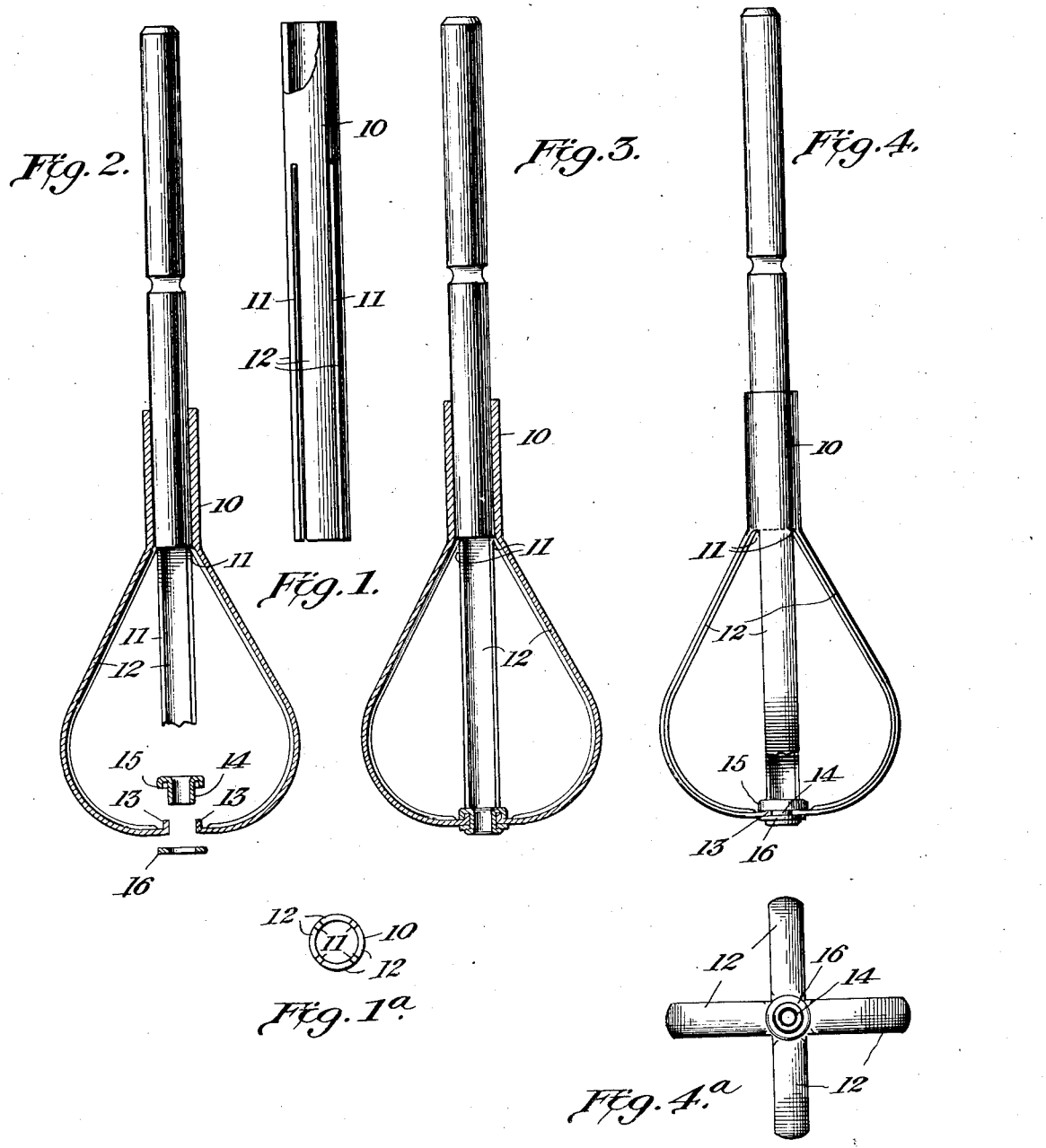

1,919,101

UNITED STATES PATENT OFFICE

PATRICK J. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT

BEATER CONSTRUCTION

Application filed June 4, 1931. Serial No. 542,188.

This invention relates to a method of manufacturing a beater blade and to the article so constructed.

One of the features of the present invention is the construction of a beater blade from a piece of tubing by slitting and bending operations, and securing together the free ends of the tubing.

Another feature of the invention is the construction of a beater blade by securing the lower ends of the beater arms together by a mushroom rivet whereby to hold the ends of the arms in alignment and to prevent their movement radially away from one another.

With these and other objects in view as will appear in the course of the following specification and claim, an illustrative form of construction of a beater according to the present invention is set forth in the accompanying drawing, in which:

Figs. 1 and 1a are respectively a side elevation and an end view of a slit tubing from which a beater blade is to be constructed.

Fig. 2 is a view showing the tubing bent into the approximate form for a beater, with a mushroom rivet and washer shown ready for insertion.

Fig. 3 is a view corresponding to Fig. 2 but showing the rivet and washer in completed position, in which the beater arms are held fast.

Fig. 4 is a side elevation of a completed beater.

Fig. 4a is a corresponding end view.

In Figs. 1 and 1a, it is shown that a piece of ordinary tubing of proper length and diameters is formed with slits 11 extending from one end thereof but leaving a sleeve 10 at the opposite end, to which are integrally joined the arms 12.

The individual tines or arms thus formed are bent outwardly adjacent the ends of these slits, and then the free ends of these tines or arms are bent inwardly. A desired curvilinear shape is given to these arms, and preferably the arcuate cross section is retained for substantially the entire length of the arm. The extreme ends are preferably flattened down and brought into the same plane, each end being provided with an offset or re-bent lug 13.

A mushroom rivet 14, illustrated as tubular, is then passed between the arms until the lugs 13 are engaged within the skirt formed by the flange 15 of the rivet. Preferably a washer 16 is then seated around the tubular portion of the rivet and the latter is crimped down to establish a secure holding relationship as shown in Fig. 3, in which the ends of the several arms 12 are held fixedly together so that they cannot be pulled apart by a radial movement away from the axis of the beater blade. A spindle 17 comprising a length of rod is then inserted into the cylindrical portion 10 of the beater blade and held in position as by sweating. This spindle 17 may have a driving pin 18 and a groove 19 by which it may be retained in a proper driving device.

Further, it is preferred to sweat solder into the interstices at the free ends of the arms, as shown by the solder supports 20 (Fig. 3), whereby to close crevices which might receive and retain food particles.

It will be understood that any desired number of arms may be provided, four being shown on the accompanying drawing.

It is obvious that the invention may be employed in many ways without departing from the scope of the appended claim.

I claim:

A beater blade comprising a tubular portion having integrally joined arms extending away from and then toward one another so that the free ends lie substantially in a plane at a right angle to the axis of the tubular portion, a mushroom-headed rivet engaged with said arms and fitting over the lugs thereof, and a washer surrounding said rivet and engaged with the opposite surfaces of said arms, said rivet having a crimped portion engaging said washer to hold the arms and lugs clamped together and to said rivet.

PATRICK J. FITZGERALD.